(12) United States Patent
Gisoldi et al.

(10) Patent No.: US 8,790,057 B2
(45) Date of Patent: Jul. 29, 2014

(54) THREADED FASTENER

(71) Applicants: Mauricio Gisoldi, Braganca Paulista (BR); Leandro Westmann Prado, Braganca Paulista (BR)

(72) Inventors: Mauricio Gisoldi, Braganca Paulista (BR); Leandro Westmann Prado, Braganca Paulista (BR)

(73) Assignee: Tyco Electronics Brasil LTDA, Sao Paulo (BR)

( * ) Notice: Subject to any disclaimer, the term of this patent is extended or adjusted under 35 U.S.C. 154(b) by 0 days.

(21) Appl. No.: 13/727,673

(22) Filed: Dec. 27, 2012

(65) Prior Publication Data
US 2014/0186135 A1 Jul. 3, 2014

(51) Int. Cl.
*F16B 39/02* (2006.01)
(52) U.S. Cl.
USPC ............ 411/334; 411/360; 411/501; 411/506
(58) Field of Classification Search
USPC ......... 411/334, 360, 363, 501, 502, 506, 515, 411/522
See application file for complete search history.

(56) References Cited

U.S. PATENT DOCUMENTS

| | | | |
|---|---|---|---|
| 2,132,950 | A | 10/1938 | Green |
| 3,169,565 | A | 2/1965 | Surratt |
| 3,554,258 | A | 1/1971 | Duffy |
| 4,071,067 | A | 1/1978 | Goldby |
| 4,339,179 | A | 7/1982 | Dany |
| 4,850,774 | A | 7/1989 | Weaver et al. |
| 4,890,964 | A | 1/1990 | Lindley et al. |
| 5,183,359 | A | 2/1993 | Barth |
| 5,722,139 | A | 3/1998 | Ladouceur et al. |
| 5,762,456 | A | 6/1998 | Aasgaard |
| 6,135,689 | A | 10/2000 | Matsunami |
| 6,216,510 | B1 | 4/2001 | Hashimoto |
| 7,014,406 | B2 | 3/2006 | Robertson |
| 7,597,516 | B2 | 10/2009 | Bucciferro et al. |
| 7,658,581 | B2 | 2/2010 | Subenbach |
| 7,905,384 | B1 | 3/2011 | Spiegelberg et al. |
| 2009/0038137 | A1 | 2/2009 | Hassenzahl |

*Primary Examiner* — Robert A Delisle

(57) ABSTRACT

A fastener having a shaft, a threaded portion, a positioning member and a rivet head. The shaft has a first diameter and extends from a first end to a second end. The threaded portion is positioned on the shaft. The positioning member is provided on the shaft proximate the second end. The rivet head extends from the second end of the shaft in a direction away from the first end, with the rivet head having a second diameter which is less than the first diameter of the shaft. The rivet head is configured to be deformed such that the deformed rivet head has a third diameter which is greater than the first diameter, thereby securing the fastener to a mating member which is positioned between the positioning member and the deformed rivet head.

20 Claims, 5 Drawing Sheets

THREADED FASTENER

FIELD OF THE INVENTION

The present invention is directed to a fastener. In particular, the invention is directed to a threaded fastener which has a rivet head provided at one end.

BACKGROUND OF THE INVENTION

Threaded fasteners are well known in the art. While various threaded fasteners are known, in one such threaded fastener, the shape and pitch of the spiral threads cause large frictional forces to be present when a nut is moved into engagement with the threads. This causes the treaded portion to be self locking due to the large area of sliding contact between the threads of the threaded portion and the threads of the nut. Essentially, applying a torque to the nut allows the nut to turn, but no amount of axial load applied against the nut or the treaded portion will cause the nut to become loose.

The known threaded fasteners have various disadvantages. Due to the complex and bulky configuration of the heads of the prior art threaded fasteners, high pressure and slow speeds are required to seat the threaded fasteners. Known threaded fasteners also require heads with diameters larger than the diameter of the threaded portion. Consequently, during manufacturing, a large volume of scrap is generated to reduce the diameter of the thread portion from the diameter of the stock material required to manufacture the head. In addition, known threaded fasteners require teeth or similar projections to allow the head to be properly secured to and grip the surface of a mating member to which the threaded fastener is secured. This requires relatively sophisticated tooling to manufacture the head. Known threaded fasteners are also relatively heavy.

It would, therefore, be beneficial to provide a threaded fastener which is lean and lightweight which can be manufactured by stamping, machining or other known methods. It would also be beneficial to provide a threaded fastener which is easily manufactured and is easily assembled to a mating member or component using non-complex tools. The manufacture and use of the threaded fastener thereby resulting in the reduction of assembly time, reduction of weight of the threaded fastener and reduction of the weight of the final product.

SUMMARY OF THE INVENTION

An exemplary embodiment is directed to a fastener having a shaft, a threaded portion, a positioning member and a rivet head. The shaft has a first diameter and extends from a first end to a second end. The threaded portion is positioned on the shaft. The positioning member is provided on the shaft proximate the second end. The rivet head extends from the second end of the shaft in a direction away from the first end, with the rivet head having a second diameter which is less than the first diameter of the shaft. The rivet head is configured to be deformed such that the deformed rivet head has a third diameter which is greater than the first diameter, thereby securing the fastener to a mating member which is positioned between the positioning member and the deformed rivet head.

An exemplary embodiment is also directed to a fastener with a shaft having a first diameter and which extends from a first end to a second end. A threaded portion is positioned on the shaft. A positioning member is also provided on the shaft proximate the second end, the positioning member extends radially outward around a circumference of the shaft. A rivet head extends from the second end of the shaft in a direction away from the first end. The rivet head has a second diameter which is less than the first diameter of the shaft. An opening of the rivet head extends from a free end of the rivet head inward toward the second end of the shaft. The opening has at least one sidewall, with the opening facilitating the deformation of the at least one sidewall of the rivet head. The rivet head is configured to be deformed such that the deformed rivet head has a third diameter which is greater than the first diameter, thereby securing the fastener to a mating member which is positioned between the positioning member and the deformed rivet head.

An exemplary embodiment is also directed to a fastener with a shaft having a first diameter. The shaft extending from a first end to a second end. A threaded portion is positioned on the shaft and has spiral threads which extend from proximate the first end of the shaft toward the second end. The shape and pitch of the spiral threads results in large frictional forces being present when a nut is moved into engagement with the spiral threads. A rivet head extends from the second end of the shaft in a direction away from the first end, with the rivet head having a second diameter which is less than the first diameter of the shaft. A positioning member is provided on the shaft proximate the second end, with the positioning member being provided between the spiral threads and the rivet head. The rivet head is configured to be deformed such that the deformed rivet head has a third diameter which is greater than the first diameter, thereby securing the fastener to a mating member which is positioned between the positioning member and the deformed rivet head.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
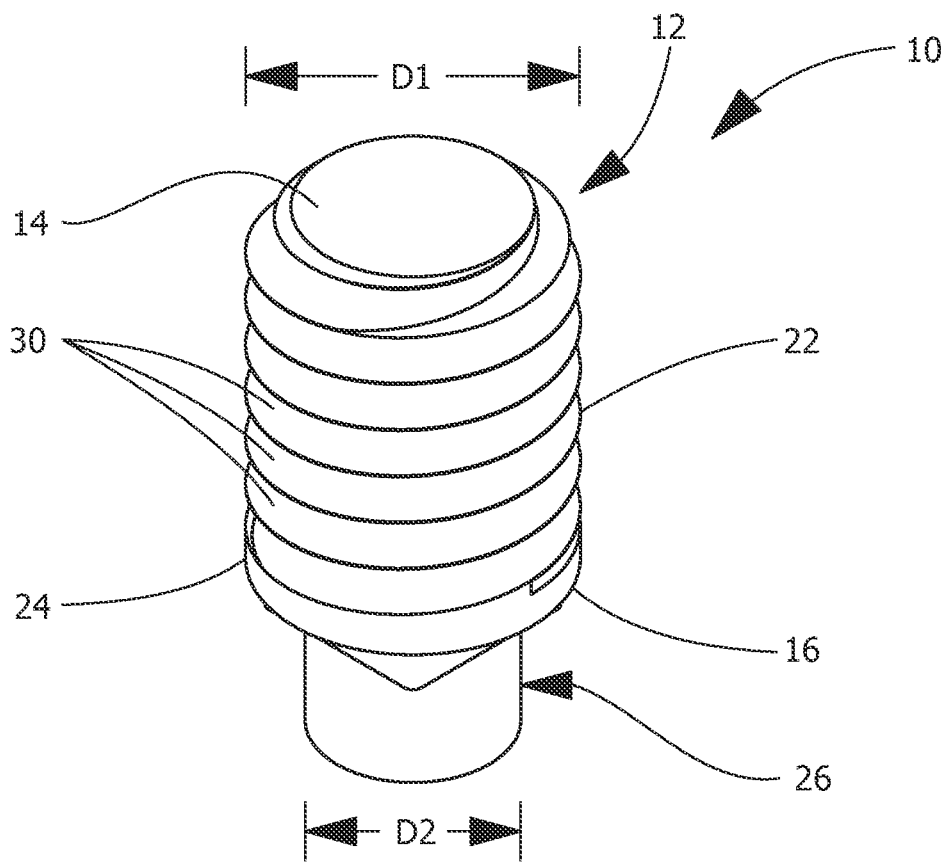
FIG. 1 is a perspective view of an exemplary threaded fastener of the present invention.

The present invention will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that spatially relative terms, such as "top", "upper", "lower" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "over" other elements or features would then be oriented "under" the other elements or features. Thus, the exemplary term "over" can encompass both an orientation of over and under. The device may be otherwise oriented (rotated 90 degrees or at other orientations) and the spatially relative descriptors used herein interpreted accordingly.

Referring to FIG. 1, an exemplary embodiment of a threaded fastener 10, such as a screw or bolt is shown. The threaded fastener 10 may be made from a wide variety of materials, including but not limited to, ferrous, non ferrous, and resins.

In the embodiment shown, the treaded threaded fastener is a bolt which has a cylindrical shaft 12, with a first diameter D1. The shaft 12 has a first end 14 and a second end 16. A cylindrical threaded portion 22 is positioned on the shaft 12 and extends from proximate the first end 14 toward the second end 16. A positioning member 24 is provided on the shaft 12 proximate the second end 16. A rivet head 26 extends from the second end 16 of the shaft 12 in a direction away from the first end 14.

Threaded portion 22 has spiral threads 30 which are adapted to receive a securing nut (not shown) thereon. In the exemplary embodiment shown in FIGS. 1 through 5, the threaded portion 22 is configured to receive a ring terminal, or other type of fastener made from metal or other material, thereon prior to the securing nut being received on the threaded portion 22. In one exemplary embodiment, the threaded cylindrical portion 22 may be self locking. Due to the shape and pitch of the spiral threads 30, large frictional forces are present when a nut is moved into engagement with the threads 30. In one exemplary embodiment, this causes the treaded portion 22 to be self locking due to the large area of sliding contact between the threads 30 of the threaded portion 22 and the threads of the nut (not shown). Essentially, applying a torque to the nut allows the nut to turn, but no amount of axial load applied against the nut or the treaded portion 22 will cause the nut to become loose.

The positioning member 24 is provided between the cylindrical threaded portion 22 and the rivet head 26. In the embodiment shown, the positioning member 24 extends radially outward around the circumference of the shaft 12. The positioning member 24 has a shoulder 40 which is positioned proximate the rivet head 26 and which cooperates with a mating surface of a mating object, as will be more fully described. Although the exemplary embodiment illustrates a positioning member 24 which extends about the entire circumference of the shaft 12, other embodiments may be used without departing from the scope of the invention. As an example, as shown in FIG. 3, the positioning member may be individual projections which are spaced periodically about the circumference of the shaft rather than one continuous member as shown.

In the exemplary embodiment shown in FIGS. 1 through 5, the head 26 of the threaded fastener 10 is in the form of a semi-tubular or tubular rivet. However, other type of rivet head configurations may be used without departing from the scope of the invention.

Figure 2:
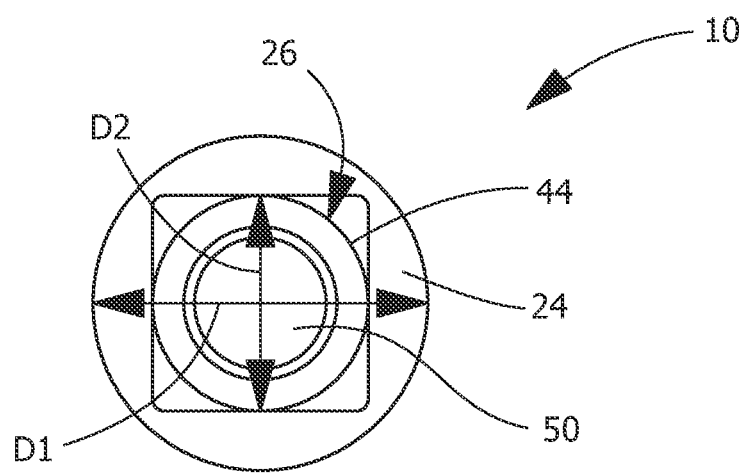
FIG. 2 is a bottom view of the exemplary threaded fastener of FIG. 1.
Figure 3:
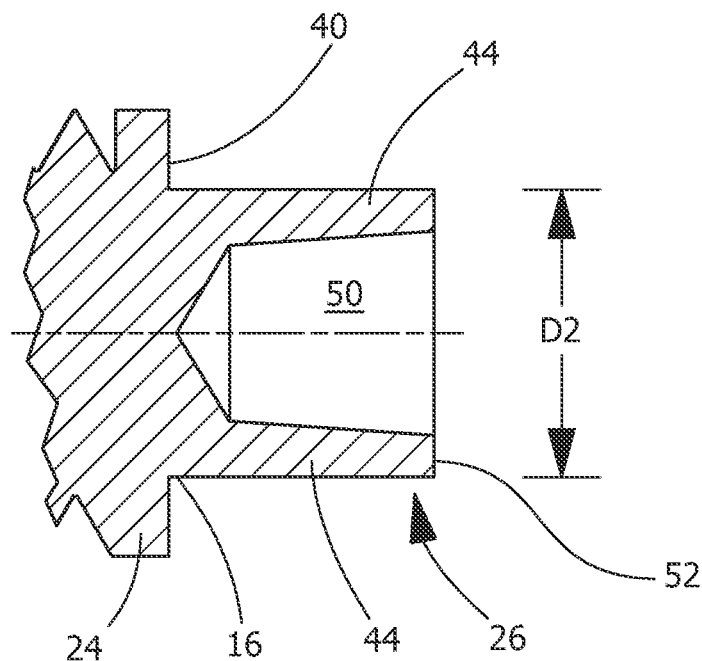
FIG. 3 is a cross-sectional view taken along the longitudinal axis of the threaded fastener of the rivet head of the threaded fastener of FIG. 1; the threaded fastener is shown prior to the deformation of the head.

As shown in FIGS. 1 through 3, rivet head 26 has a second diameter D2 which is smaller or less than the diameter D1 of the shaft 12. The rivet head 26 has an opening 50 which extends from a free end 52 of the head 26 inward toward the second end 14 of the shaft 12. The opening 50 has a circumferentially extending sidewall 44. The purpose of this opening 50 is to facilitate the deformation of the head 26 and reduce the amount of force needed for application by rolling or deforming the tubular portion and the sidewall 44 outward.

Figure 5:
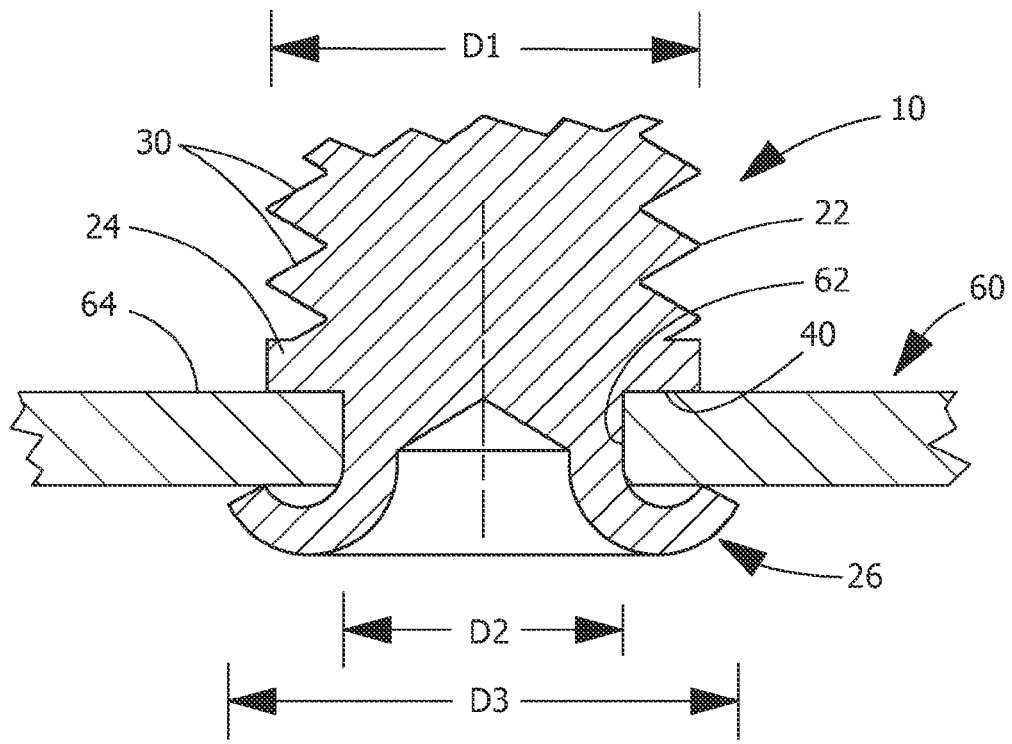
FIG. 5 is a cross-sectional view of the threaded fastener of FIG. 1 inserted into an opening of mating member, with the threaded fastener shown after the deformation of the rivet head, thereby securing the threaded fastener to the mating member.

Referring to FIG. 5, the threaded fastener 10 is shown connected to a mating member 60. This is but one exemplary use of the threaded fastener 10, as the threaded fastener 10 can be used in many different applications and with many different mating members or components. To install the threaded fastener 10 on the mating member 60, the head 26 is inserted through a respective opening 62 of the mating member 60. This continues until the shoulder 40 of the positioning member 24 engages a surface 64 of the mating member 60.

Figure 4:
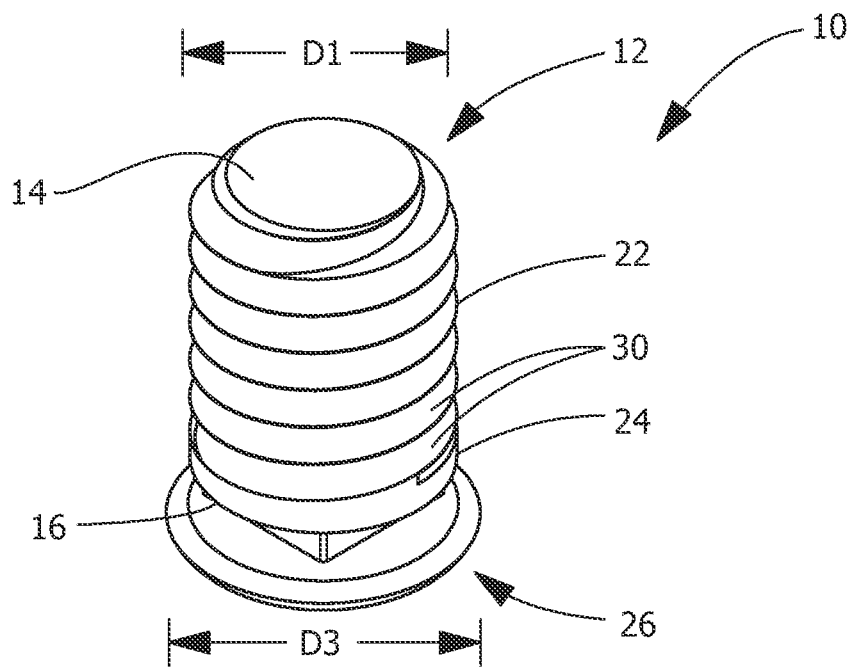
FIG. 4 is a perspective view of the exemplary threaded fastener of FIG. 1, with the rivet head deformed, the mating member is not shown to better illustrate the rivet head.

With the shoulder 40 of the positioning member 24 positioned proximate the surface 64 of the mating member 60, the rivet heads 26 are "bucked". The term bucked is a term of art that refers to the deformation of the rivet. The bucking or deformation of the rivet head is similar to methods known in the art for rivet heads. This deformation of the rivet head 26 is done using a specially shaped solid block of metal. An assembly machine or rivet gun using a series of high impulse forces may be used to perfect the deformation of the head 26. Alternatively, a ball-peen hammer may be used. In addition, squeezing may be used for form the head 26. In this process a tool, placed in contact with the each end of the threaded fastener, clinches to deform the head 26. FIG. 4 illustrates the configuration of the threaded fastener 10 after the head 26 has been deformed or bucked.

As shown in FIG. 5, with the rivet head 26 properly deformed, the surface 64 of the mating member 60 is trapped between the head 26 and the shoulder 40 of the positioning member 24. When deformed rivet head 26 has a third diameter D3 which is greater than the first diameter D1, thereby securing the fastener 10 to the mating member 60. In this position, the deformed rivet head 26 causes the mating member 60 to engage the positioning member 24, thereby providing sufficient frictional engagement and force between the positioning member 24, mating member 60 and deformed head 24 to prevent the movement of the threaded fastener 10 relative to the mating member 60. The threaded fastener 10 is thereby placed in secure mechanical and electrical engagement with the mating member 60. This allows a nut or the like to be properly inserted on the thread portion 22 of the fastener 10.

An alternate embodiment is shown in FIG. 6 through 10, where the rivet head 126 of the threaded fastener 110 is in the form of a square type rivet. Other configurations of the head are also possible without departing from the scope of the invention. As an example, the head may be in the shape of a triangle.

Figure 6:
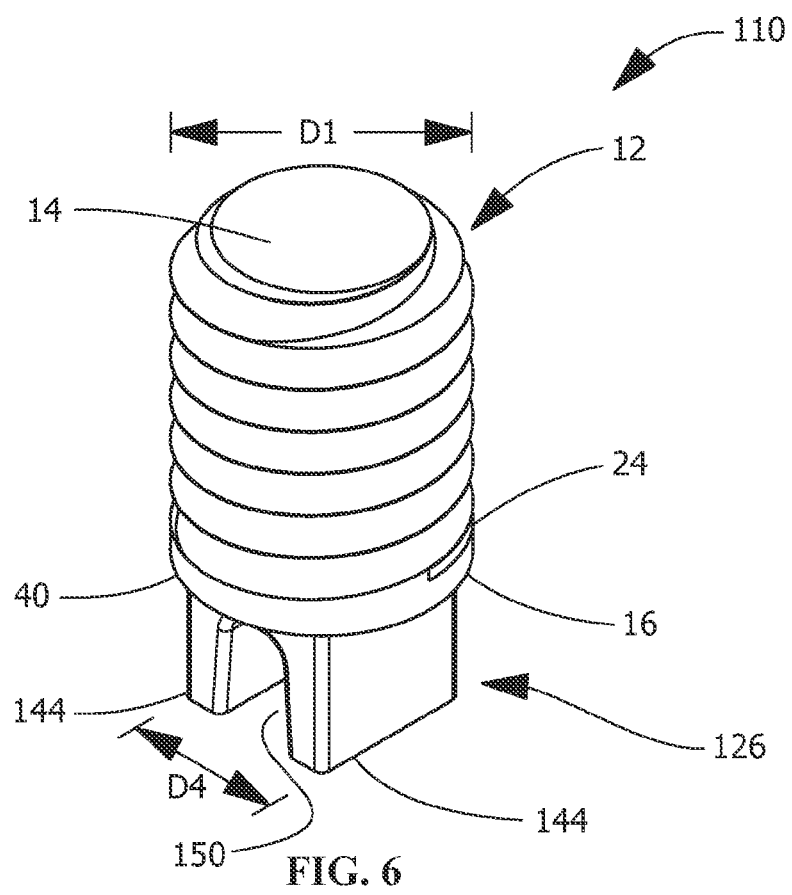
FIG. 6 is a perspective view of an alternate exemplary threaded fastener of the present invention.
Figure 7:
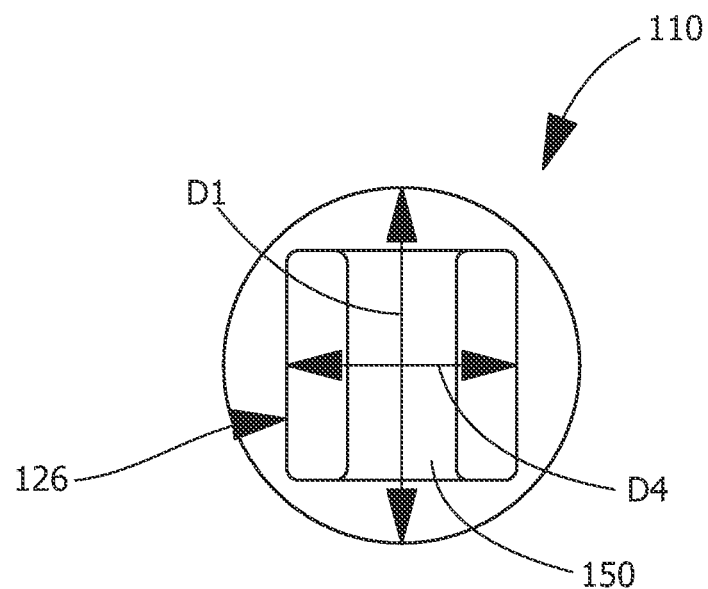
FIG. 7 is a bottom view of the exemplary threaded fastener of FIG. 6.
Figure 8:
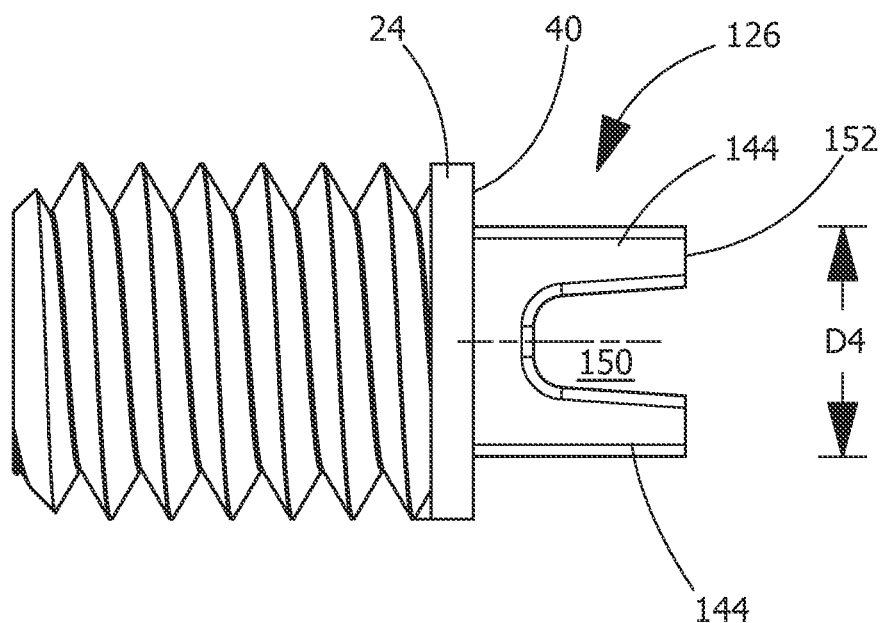
FIG. 8 is a side view of the rivet head of the threaded fastener of FIG. 6; the threaded fastener is shown prior to the deformation of the head.

As shown in FIGS. 6 through 8, rivet head 126 has a diameter or dimensions D4 which is smaller or less than the diameter D1 of the shaft 12. The rivet head 126 has an opening or cavity 150 which extends from a free end 152 of the rivet head 126 inward toward the second end 16 of the shaft 12. The cavity 150 extends between the two opposed sidewalls 144 of the rivet head 126. The purpose of this cavity 150 is to facilitate the deformation of the head 126 and to reduce the amount of force needed for application by rolling or deforming the sidewalls 144 outward.

Figure 10:
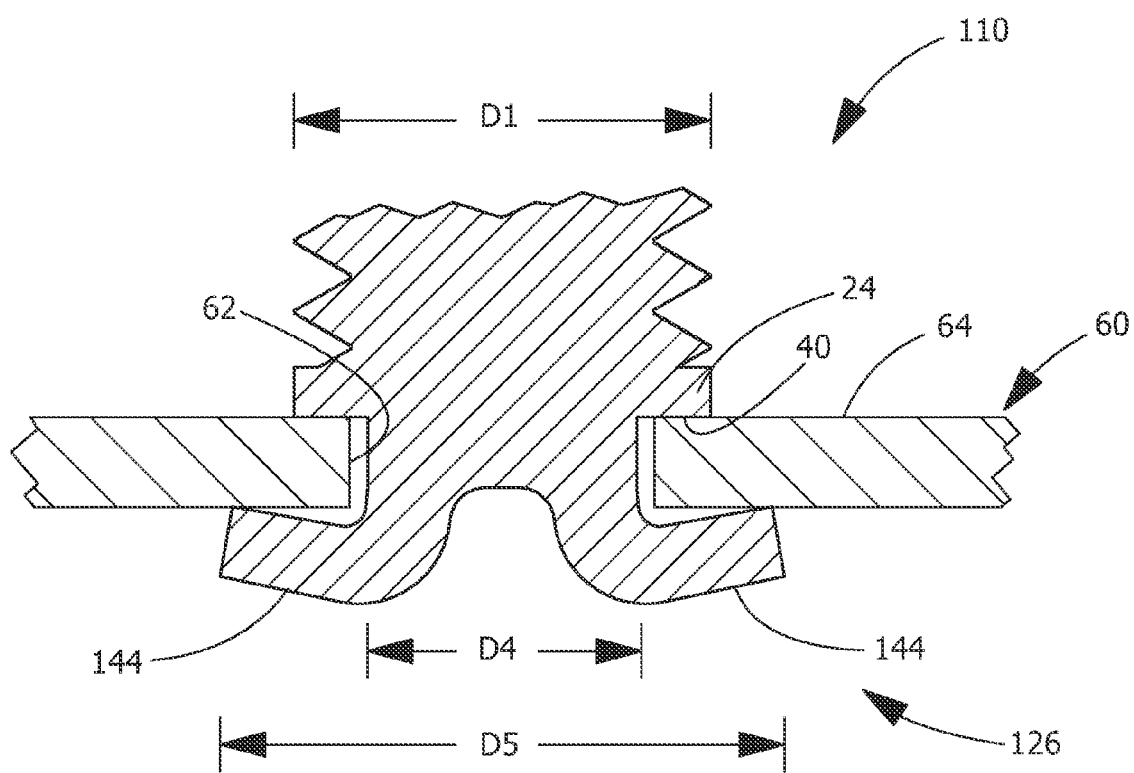
FIG. 10 is a cross-sectional view of the threaded fastener of FIG. 6 inserted into an opening of mating member, with the threaded fastener shown after the deformation of the rivet head, thereby securing the threaded fastener to the mating member.

Referring to FIG. 10, the threaded fastener 110 is shown connected to a mating member 60. This is but one exemplary use of the threaded fastener 110, as the threaded fastener 110 can be used in many different applications and with many different mating members or components. To install the threaded fastener 110 on the mating member 60, the head 126 is inserted through a respective opening 62 of the mating member 60. This continues until the shoulder 40 of the positioning member 24 engages a surface 64 of the mating member 60. In the exemplary embodiment shown, the mating member 60 is a battery terminal quick connection member.

Figure 9:
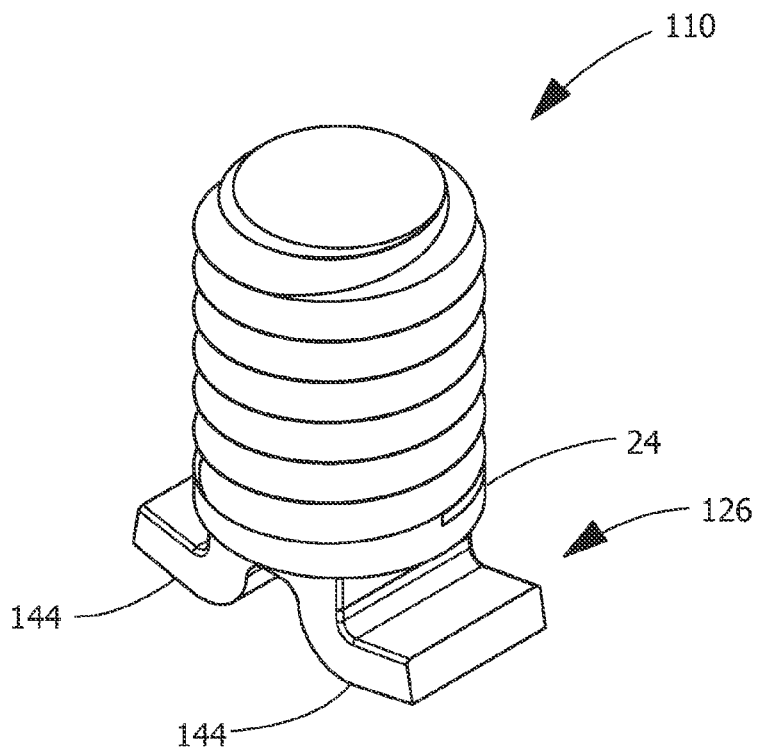
FIG. 9 is a perspective view of the exemplary threaded fastener of FIG. 6, with the rivet head deformed, the mating member is not shown to better illustrate the rivet head.

With the shoulder 40 of the positioning member 24 positioned proximate the surface 64 of the mating member 60, the rivet heads 126 are "bucked" or deformed as is know in the art for rivet heads. This deformation of the rivet head 126 is done using a specially shaped solid block of metal. An assembly machine or rivet gun using a series of high impulse forces may be used to perfect the deformation of the head 126. Alternatively, a ball-peen hammer may be used. In addition, squeezing may be used for form the head 126. In this process a tool, placed in contact with the each end of the threaded fastener, clinches to deform the head 126. FIG. 9 illustrates the configuration of the threaded fastener 110 after the head 126 has been deformed or bucked.

As shown in FIG. 10, with the rivet head 126 properly deformed, the surface 64 of the mating member 60 is trapped between the head 126 and the shoulder 40 of the positioning member 24. When deformed, rivet head 126 has a diameter D5 which is greater than the first diameter D1, thereby securing the fastener 110 to the mating member 60. In this position, the deformed rivet head 126 causes the mating member 60 to engage the positioning member 24, thereby providing sufficient frictional engagement and force between the positioning member 24, connection member 60 and deformed head 126 to prevent the movement of the threaded fastener 110 relative to the mating member 60. The threaded fastener 110 is thereby placed in secure mechanical and electrical engagement with the mating member 60. This allows a nut or the like to be properly inserted on the thread portion 22 of the fastener 110.

The threaded fasteners 10, 110 described herein, and other threaded fasteners which use the principals of the invention illustrated by the exemplary embodiments have various advantages over the fasteners and screws currently available. Previously, because of the complex and bulky configuration of the heads of the prior art fasteners, it was necessary to apply or seat the screws using high pressure and at a slow speed to insure for proper operation. In contrast, the configuration of the heads according to the present invention allows the heads to be deformed using reduced pressure and at increased speeds, while still insuring that the deformed heads cooperate with the surfaces to which they are applied to properly seat the screw and maintain the screw in proper position.

The configuration of the head, as described above, also allows for the threaded fastener to be manufactured with minimal scrap. Previous threaded fasteners required heads with diameters larger than the diameter of the threaded portion. Consequently, during manufacturing, a large volume of scrap would be generated to reduce the diameter of the thread portion from the diameter of the stock material required to manufacture the head. In contrast, as the head of the present invention has a diameter which is less than the diameter of the threaded portion, the amount of scrap required to manufacture the present invention is greatly reduced.

The complexity of the threaded fastener of the present invention is also reduced. In prior art threaded fasteners, teeth and the like would be required to allow the head to be properly secured to and grip the surface to which the threaded fastener was secured. This required relatively sophisticated tooling to manufacture the head. In contrast, the head of the present invention, regardless of the configuration, is easily manufactured, as not teeth or complicated holding members are required. When fully inserted and deformed, the free ends of the head make contact with the surface to maintain the threaded fastener in position. This eliminates the need for precisely manufactured teeth and the like and allows for the head to be manufactured without the need for exact tolerances.

The design as described and claimed herein is a lean, lightweight design as compared to the prior art. In fact, the threaded fasteners may have a thickness of 2 mm or less, thereby providing significant cost savings. The threaded fastener can be manufactured by stamping, machining or other known methods. As previously described, the threaded fastener is easily manufacturing and is easily assembled to a mating member or component using non-complex tools.

The manufacture and use of the threaded fastener thereby results in the reduction of assembly time, reduction of weight of the threaded fastener, reduction of the weight of the final product, reduction of scrap and the reduction of cost.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A fastener for fastening to a mating member, the fastener comprising:
   a shaft having a first diameter, the shaft extending from a first end to a second end;
   a threaded portion positioned on the shaft;
   a positioning member provided on the shaft proximate the second end;
   a rivet head extending from the second end of the shaft in a direction away from the first end, the rivet head having a second diameter which is less than the first diameter of the shaft, the rivet head having a cavity which extends from a free end of the rivet head inward toward the second end of the shaft, the cavity facilitates the deformation of the rivet head;
   wherein, the rivet head is configured to be deformed such that the deformed rivet head has a third diameter which is greater than the first diameter, the deformed rivet head causing the mating member to engage the positioning member, thereby providing sufficient frictional engagement and force between the positioning member, mating member and deformed rivet head to prevent the movement of the fastener relative to the mating member and secure the fastener in mechanical and electrical engagement to the mating member.

2. The fastener as recited in claim 1, wherein the threaded portion has spiral threads which extend from proximate the first end of the shaft toward the second end.

3. The fastener as recited in claim 2, wherein the shape and pitch of the spiral threads results in large frictional forces are present when a nut is moved into engagement with the spiral threads, thereby causing the threaded portion to be self locking.

4. The fastener as recited in claim 2, wherein the positioning member is provided between the spiral threads and the rivet head.

5. The fastener as recited in claim 1, wherein the positioning member extends radially outward around a circumference of the shaft.

6. The fastener as recited in claim 4, wherein the positioning member has a shoulder which is positioned proximate the rivet head.

7. The fastener as recited in claim 1, wherein the rivet head has a tubular rivet configuration.

8. The fastener as recited in claim 7, wherein the rivet head has an opening which extends from a free end of the rivet head inward toward the second end of the shaft, the opening the cavity has a circumferentially extending sidewall, the opening facilitates the deformation of the rivet head, the cavity reducing the amount of force needed for application by rolling or deforming the sidewall outward.

9. The fastener as recited in claim 1, wherein the rivet head has a square rivet configuration.

10. The fastener as recited in claim 9, wherein the cavity extends between two opposed sidewalls of the rivet head, the cavity reducing the amount of force needed for application by rolling or deforming the sidewalls outward.

11. A fastener for fastening to a mating member, the fastener comprising:
a shaft having a first diameter, the shaft extending from a first end to a second end;
a threaded portion positioned on the shaft;
a positioning member provided on the shaft proximate the second end, the positioning member extending radially outward around a circumference of the shaft;
a rivet head extending from the second end of the shaft in a direction away from the first end, the rivet head having a second diameter which is less than the first diameter of the shaft, the rivet head having an opening which extends from a free end of the rivet head inward toward the second end of the shaft, the opening has at least one sidewall, the opening facilitating the deformation of the at least one sidewall of the rivet head;
wherein, the rivet head is configured to be deformed such that the deformed rivet head has a third diameter which is greater than the first diameter, the deformed rivet head causing the mating member which is positioned between the positioning member and the deformed rivet head to engage the positioning member, thereby providing sufficient frictional engagement and force between the positioning member, mating member and deformed rivet head to prevent the movement of the fastener relative to the mating member and secure the fastener in mechanical and electrical engagement to the mating member.

12. The fastener as recited in claim 11, wherein the threaded portion has spiral threads which extend from proximate the first end of the shaft toward the second end, the shape and pitch of the spiral threads results in large frictional forces are present when a nut is moved into engagement with the spiral threads, thereby causing the threaded portion to be self locking.

13. The fastener as recited in claim 12, wherein the positioning member is provided between the spiral threads and the rivet head.

14. The fastener as recited in claim 11, wherein the rivet head has a tubular rivet configuration.

15. The fastener as recited in claim 11, wherein the rivet head has a square rivet configuration.

16. A fastener for fastening to a mating member, the fastener comprising:
a shaft having a first diameter, the shaft extending from a first end to a second end;
a threaded portion positioned on the shaft, the threaded portion having spiral threads which extend from proximate the first end of the shaft toward the second end, the shape and pitch of the spiral threads resulting in large frictional forces are present when a nut is moved into engagement with the spiral threads;
a rivet head extending from the second end of the shaft in a direction away from the first end, the rivet head having a second diameter which is less than the first diameter of the shaft;
a positioning member provided on the shaft proximate the second end, the positioning member provided between the spiral threads and the rivet head;
wherein, the rivet head is configured to be deformed such that the deformed rivet head has a third diameter which is greater than the first diameter, the deformed rivet head causing the mating member which is positioned between the positioning member and the deformed rivet head to engage the positioning member, thereby providing sufficient frictional engagement and force between the positioning member, mating member and deformed rivet head to prevent the movement of the fastener relative to the mating member and secure the fastener in mechanical and electrical engagement to the mating member.

17. The fastener as recited in claim 16, wherein the rivet head has a tubular rivet configuration.

18. The fastener as recited in claim 17, wherein the rivet head has an opening which extends from a free end of the rivet head inward toward the second end of the shaft, the opening has a circumferentially extending sidewall, the opening facilitates the deformation of the rivet head, reducing the amount of force needed for application by rolling or deforming the sidewall outward.

19. The fastener as recited in claim 16, wherein the rivet head has a square rivet configuration.

20. The fastener as recited in claim 19, the rivet head has a cavity which extends from a free end of the rivet head inward toward the second end of the shaft, the cavity extends between the two opposed sidewalls of the rivet head, the cavity facilitates the deformation of the rivet head, reducing the amount of force needed for application by rolling or deforming the sidewalls outward.

* * * * *